(12) United States Patent
Modrzejewski et al.

(10) Patent No.: US 6,817,438 B2
(45) Date of Patent: Nov. 16, 2004

(54) APPARATUS AND A METHOD FOR ADJUSTING FLUID MOVEMENT IN A VARIABLE DISPLACEMENT PUMP

(75) Inventors: Brian Stanley Modrzejewski, Westland, MI (US); Shawn Patrick Capser, Monroe, MI (US); Steven Thomas Nissen, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/040,955

(22) Filed: Dec. 28, 2001

(65) Prior Publication Data

US 2002/0139605 A1 Oct. 3, 2002

Related U.S. Application Data (63) Continuation-in-part of application No. 09/826,268, filed on Apr. 3, 2001, now Pat. No. 6,470,992.

(51) Int. Cl.$^7$ .............................................. F04B 49/00
(52) U.S. Cl. ..................... 180/429; 417/220; 418/27; 180/421
(58) Field of Search ................................ 180/417, 421, 180/422, 429, 441; 417/220; 418/25–30

(56) References Cited

U.S. PATENT DOCUMENTS

| | | | |
|---|---|---|---|
| 4,183,723 A | 1/1980 | Hansen et al. | |
| 4,496,288 A | 1/1985 | Nakamura et al. | |
| 4,522,565 A | 6/1985 | Stockton | |
| 4,601,641 A | 7/1986 | Kuroyanagi et al. | |
| 4,658,584 A | 4/1987 | Suzuki et al. | |
| 4,711,619 A | 12/1987 | Sundberg et al. | |
| 4,714,413 A | 12/1987 | Duffy | |
| 5,028,214 A | 7/1991 | Masuda | |
| 5,072,650 A | 12/1991 | Phillips | |
| 5,111,660 A | 5/1992 | Gettel | |
| 5,190,447 A | 3/1993 | Schneider | |
| 5,192,196 A | 3/1993 | Gettel | |
| 5,217,296 A | 6/1993 | Tanner et al. | |
| 5,316,450 A | 5/1994 | Kast | |
| 5,513,960 A | 5/1996 | Uemoto | |
| 5,518,380 A | 5/1996 | Fujii et al. | |
| 5,562,432 A | * 10/1996 | Semba et al. | 418/26 |
| 5,690,479 A | 11/1997 | Lehmann et al. | |
| 5,799,562 A | 9/1998 | Weinberg | |
| 5,980,215 A | 11/1999 | Robeller et al. | |
| 6,155,797 A | * 12/2000 | Kazuyoshi | 417/220 |
| 6,213,730 B1 | 4/2001 | Yasuda et al. | |
| 6,217,296 B1 | 4/2001 | Miyazawa et al. | |
| 6,457,916 B2 | 10/2002 | Wienhold | |
| 6,470,992 B2 | 10/2002 | Nissen et al. | |
| 6,530,752 B2 * | 3/2003 | Oba et al. | 417/220 |
| 6,616,419 B2 * | 9/2003 | Watanabe et al. | 417/220 |
| 6,619,928 B2 * | 9/2003 | Konishi | 417/213 |
| 6,623,250 B2 * | 9/2003 | Zagranski et al. | 417/220 |
| 2002/0182083 A1 | 12/2002 | Nissen et al. | |

* cited by examiner

Primary Examiner—Avraham Lerner
(74) Attorney, Agent, or Firm—Brinks Hofer Gilson & Lione (57) ABSTRACT

A variable displacement pump is provided. A pump body has an outer ring defining an inner cavity, where the inner cavity further defines a pump suction path and a pump discharge path in fluid communication with the inner cavity. A cam ring is pivotably supported in the inner cavity by a pivot pin formed on a portion of an inner diameter of the adapter ring. An actuated cam is formed on the cam ring. An actuator is linked through the actuated cam to the cam ring for moving the cam ring in a pivotable motion. A control module is linked to the actuator.

13 Claims, 6 Drawing Sheets

APPARATUS AND A METHOD FOR ADJUSTING FLUID MOVEMENT IN A VARIABLE DISPLACEMENT PUMP

This application is a continuation in part of U.S. patent application Ser. No. 09/826,268, entitled "Auxiliary Solenoid Controlled Variable Displacement Power Steering Pump," filed on Apr. 3, 2001 now U.S. Pat. No. 6,470,992, which is incorporated herein by reference.

FIELD OF THE INVENTION

This invention relates generally to the field of pumps, in particular variable displacement pumps utilized in automotive vehicles. These pumps are designed to improve the fuel efficiency of automotive vehicles.

BACKGROUND OF THE INVENTION

In a power steering system of a vehicle, a variable displacement pump is a hydraulic pump that responds to the needs of the power steering system, as well as to changes in revolutions per minute (RPM) of the engine, by supplying fluid to the power steering system. Variable displacement pumps reduce the input torque requirements on the front-end accessory drive (FEAD) of the driving engine. In this displacement pump, the discharge flow rate increases or decreases in accordance with the speed of the engine. As the shaft speed, which is controlled by a drive belt from an engine of the vehicle, increases, the pump pressure and output flow of the pump also increases. When the pump reaches a desired shaft speed, a spool valve, and a spring allow pressure to be exposed on one side of a cam ring structure in a variable displacement pump. This pressure decreases eccentricity of the cam ring to the pump shaft center by providing a force to swing the cam ring. The decrease in eccentricity decreases the pump displacement by moving the cam ring center point towards the shaft center.

In order to control the flow rate of fluid through the variable displacement pump, various techniques have been developed. One such technique is described in U.S. Pat. No. 5,562,432, which discloses a conventional variable displacement pump having a cam ring that is moved by the pressures of the first and second fluid pressure chambers and the biasing force of the compression coil spring is formed in the second fluid pressure chamber. The movement of the cam ring occurs in accordance with an increase or decrease of the supply flow rate of the fluid accompanying a change in rotational speed of the pump, thereby controlling the pump volume to a required value. However, a problem exists in appropriately controlling the swing motion of the cam ring.

SUMMARY OF THE INVENTION

The present invention provides, in one embodiment, a variable displacement pump. A pump body has an outer ring defining an inner cavity, where the inner cavity further defines a pump suction path and a pump discharge path in fluid communication with the inner cavity. A cam ring is pivotably supported in the inner cavity by a pivot pin formed on a portion of an inner diameter of the outer ring. An actuated cam is formed on the cam ring. An actuator is linked through the actuated cam to the cam ring for moving the cam ring in a pivotable motion. A control module is linked to the actuator.

In a further embodiment of the invention a variable displacement pump is provided. A pump body has an outer ring defining an inner cavity, where the inner cavity further defines a pump suction path and a pump discharge path in fluid communication with the inner cavity. A cam ring is pivotably supported in the inner cavity by a pivot pin formed on a portion of an inner diameter of the outer ring. An actuator is linked through a screw arm to the cam ring for moving the cam ring in a pivotable motion. A control module is linked to the actuator.

In another embodiment of the invention a device is provided for adjusting the amount of fluid flowing through a variable displacement pump. A control module is configured to receive measurements of pressure from a power steering system and measurements of an engine speed from an engine of a vehicle, the module is configured to produce pump control signals. A cam ring is disposed in the variable displacement pump, the ring being actuatable in response to the signals from the control module.

In another embodiment of the invention a method for adjusting the amount of fluid flowing in a variable displacement pump is disclosed. The method includes providing a cam ring pivotably supported in an inner cavity of a pump body by a pivot pin formed on a portion of an inner diameter of the pump body and a portion of an outer diameter of the cam ring. An actuator is provided as a link to the cam ring. The control module receives measurements from an engine and measurements from a power steering system of a vehicle. The measurements are transmitted from the control module to the actuator. The cam ring is adjusted via the actuator in response to the measurements.

In yet another embodiment of the invention a system is provided for adjusting the amount of fluid flowing in a variable displacement pump in a vehicle. A power steering system includes a variable displacement pump having a pumping chamber and a pivotably mounted cam ring inside the pumping chamber. An engine is mounted in the vehicle. A control module is configured to receive measurements of pressure from the power steering system and measurements of an engine speed from the engine to move the cam ring and adjust pressure in the variable displacement pump.

BRIEF DESCRIPTION OF THE DRAWINGS

These and other advantages of the present invention will become more fully apparent as the following description is read in conjunction with the accompanying drawings, wherein.

DETAILED DESCRIPTION OF THE PREFERRED EMBODIMENT

Figure 1:
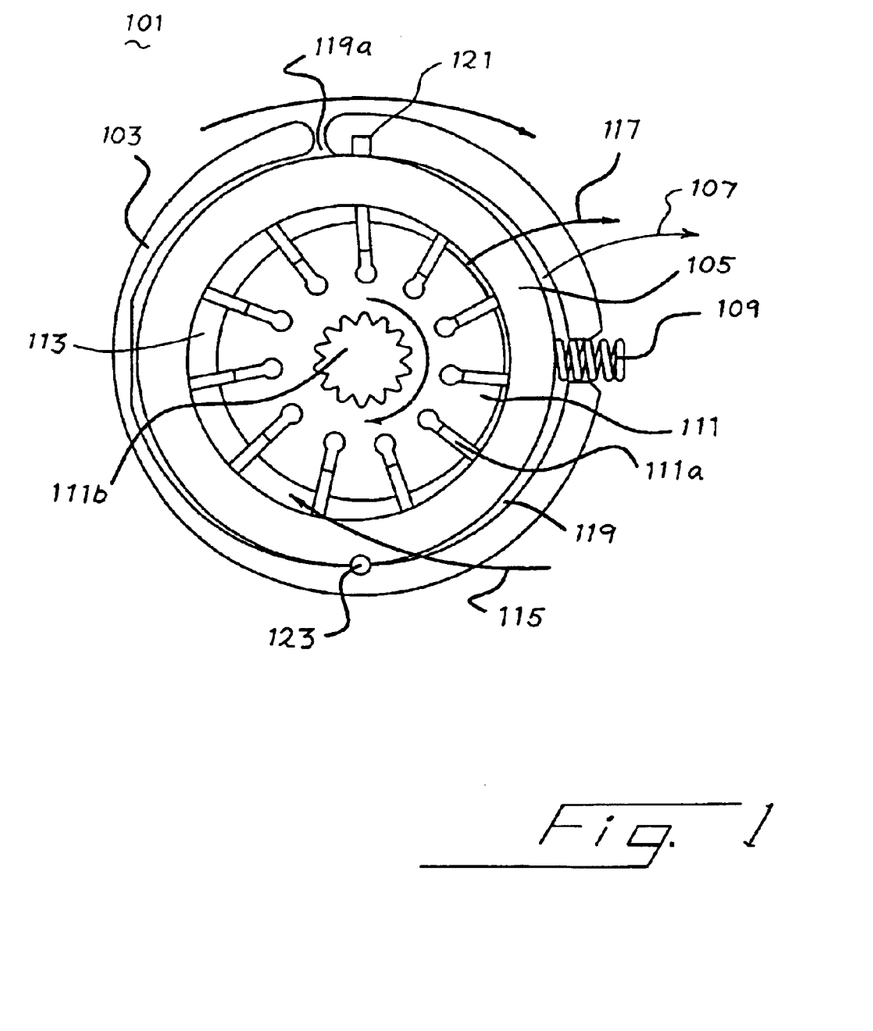
FIG. 1 depicts a sectional view of the main part of a variable displacement pump according to the preferred embodiment of the invention.

Referring to the figures, FIG. 1 is a representation of a variable displacement pump 101, which includes an outer ring 103 and a cam ring 105. The cam ring 105 is free to swing in an inner cavity 107, formed in the outer ring 103 of the pump body 101. A spring means 109 or coil spring 109 biases the cam ring 105 to the left, as shown in this view.

A rotor 111 is accommodated in the cam ring 105 to be eccentric on one side to form a pump chamber 113 on the other side. When the rotor 111 is rotatably driven by an external drive source, vanes 111a held to be movable forward or backward in the radial direction are projected and refracted. Reference numeral 111b denotes a driving shaft of the rotor 111. The rotor 111 is driven by the rotating shaft 111b to rotate in a direction indicated by an arrow in FIG. 1. Under vane ports (not shown) provide hydraulic pressure behind the vanes 111a to force the vane tips to ride along the cam ring 105 profile. This creates a sealed chamber between vanes 111a, allowing the pump 101 to do work on the fluid.

In the following description, the pump chamber 113 is a space formed in the cam ring 105 on one side of the rotor 111 and extends from a suction opening 115 to a discharge opening 117.

A fluid pressure chamber 119 is formed on two sides around an outer surface of the cam ring 105 in the inner cavity 107 of an inner surface on the outer ring 103 set in the pump body 101. Path 119a is an opening to the fluid pressure chamber 119, through a spool valve (not shown), to guide the fluid and control the pressure to swing the cam ring 105.

The pump suction opening 115 and pump discharge opening 117 are formed in at least corresponding ones of a pressure plate and a side plate (not shown) serving as stationary wall portions for holding other pump constituent elements such as the rotor 111 and cam ring 105, by sandwiching them between these plates.

The cam ring 105 is biased by the compression coil spring 109 from the fluid pressure chamber 119 and is urged in a direction to keep the volume (pump volume) in the pump chamber 113 maximized. A seal member 121 is preferably placed in the outer surface portion of the cam ring 105 to define the fluid pressure chamber 119, together with a pivot pin 123, on the right and left sides.

Figure 2:
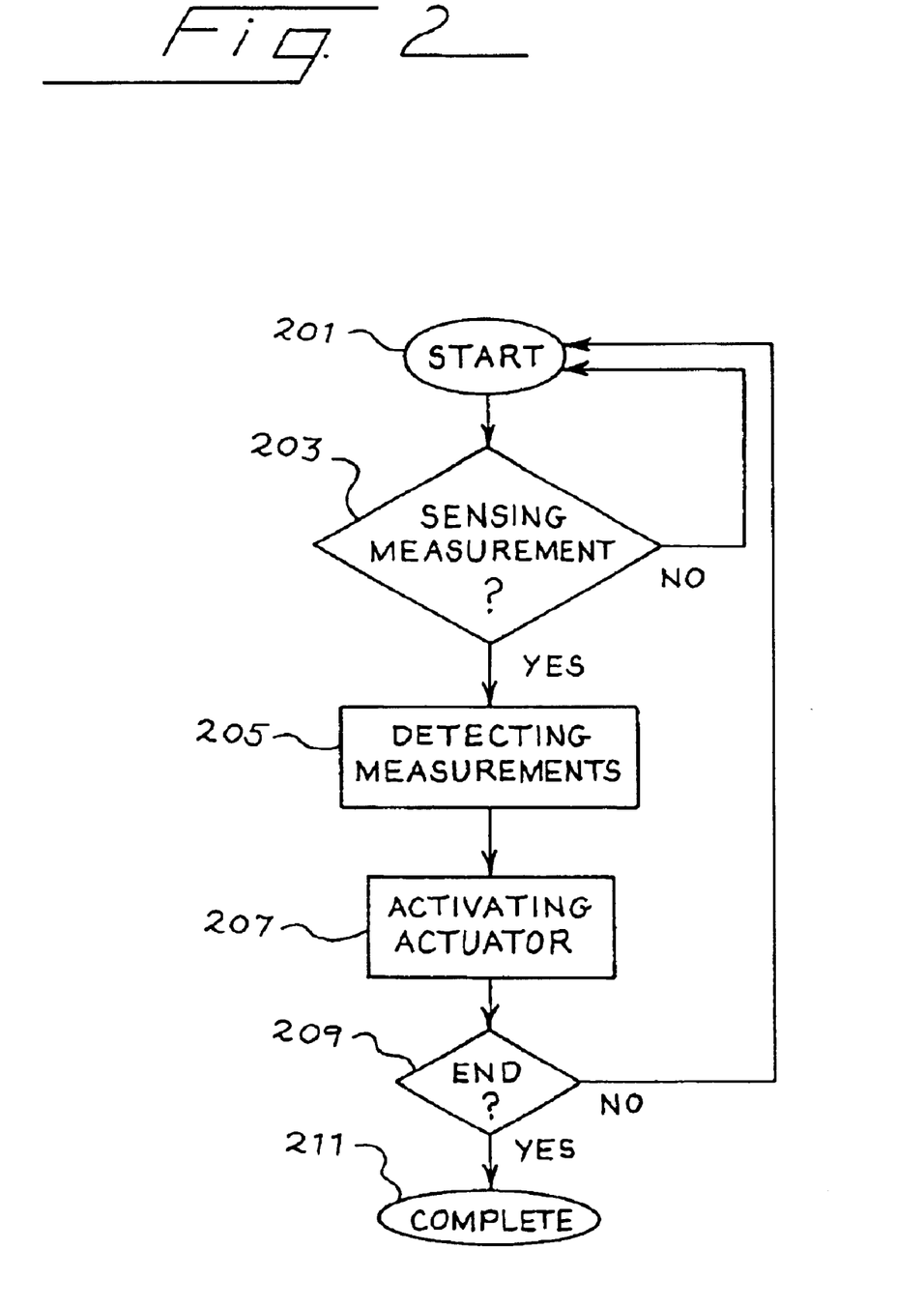
FIG. 2 depicts a flow chart according to the preferred embodiment of the invention.

FIG. 2 depicts a flow chart of the process of adjusting the amount of fluid flowing in a variable displacement pump of a vehicle. As previously described, fluid is transferred through the variable displacement pump to the power steering system as a response to the fluid needs of the power steering system. In this flow chart, the process for adjusting the amount of fluid starts at 201. At 203, measurements are taken by at least one sensor connected to an engine for measuring the engine speed. The other measurement is taken from at least one sensor from the steering hoses that is able to obtain a steering pressure of the power steering system. These sensors are able to read or sense measurements of an engine speed from the engine and pressure from the power steering system. These measurements may also be read from the vehicle's computer. Then, the sensors are able to send these measurements to a control module. The control module is able to detect the measurements 205 from these sensors.

The control module is preferably a microprocessor that utilizes one or more of the following parameters: system pressure, engine speed, steering wheel angle, pump flow and pump speed. The input parameters can be measured in various ways, including but not limited to sensors, transducers, flow meters and gauges. The control module is also programmed with a "look-up" table. The look-up table includes measurements for engine speeds and measurements of pressure for the power steering system and corresponding instructions given to the actuator to move the cam ring 105 a specific distance in the variable displacement pump. In addition, the control module may have an algorithm or matrix or any device or method that acts similar to the look-up table.

Once the control module is able to detect the measurements 205, then these detected measurements are compared with measurements on the look-up table to determine where on the table the measurements fall. The determination of where the measurements fall corresponds with the movement of the actuator by the control module at 207 to move the cam ring 105, as previously described, in the variable displacement pump. This movement of the cam ring 105 controls the amount of fluid the power steering system will receive from the variable displacement pump.

After activating the actuator at 207, the control module must decide if it should complete controlling the movement of the cam ring 105 at 209 in the variable displacement pump. If the control module decides to continue sensing and adjusting the cam ring 105, then the process continues at start 201. If the control module decides not to continue sensing and adjusting the cam ring 105, because it is no longer necessary to control the movement of the cam ring 105 then the process ends 211.

Figure 3A:
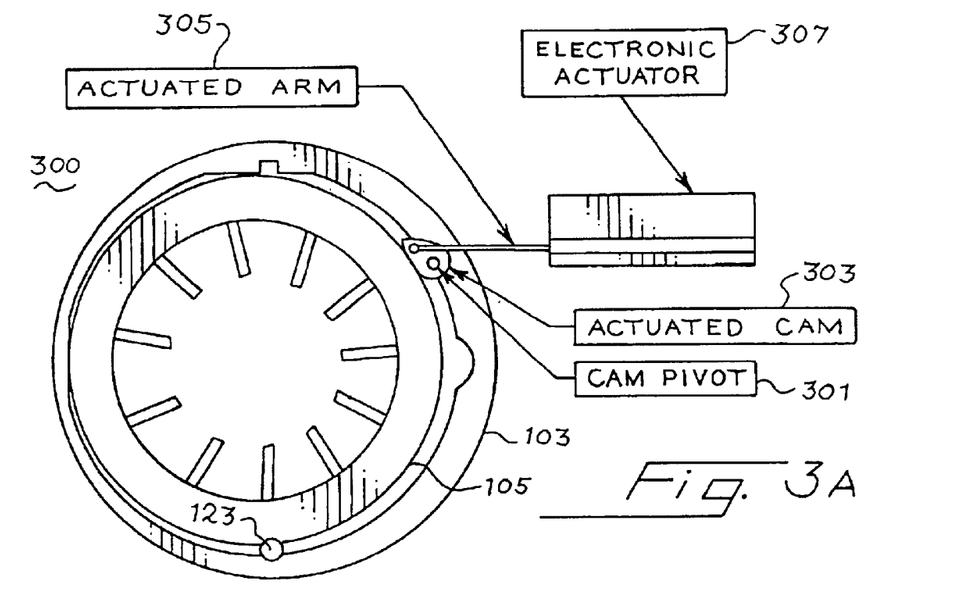
FIG. 3A depicts one view of the main part of the variable displacement pump according to the preferred embodiment of the invention.

FIG. 3A depicts one view of the main part of the variable displacement pump. One view 300 includes the outer ring 103, the cam ring 105 and the pivot pin 123, as previously described, a cam pivot 301, an actuated cam 303, an actuated arm 305 and an electronic actuator 307. The actuator 307 includes a motor and mechanism that causes the cam ring 105 to be adjusted or moved in the variable displacement pump. The actuator 307 is capable of moving the cam ring 105 in a pivotable motion over the pivot pin 123. The actuator 307 may also be referred to as an electronic leveraging device.

The actuated cam 303, is preferably a lopsided linking piece in this mechanical linkage that links the actuated arm 305 to the cam ring 105. However, the actuated cam 305 can have any shape associated with a linking piece that acts as a mechanical linkage between the actuated arm 305 and the cam ring 105. The actuator arm 305 is a mechanical arm that moves the cam ring 105 in the variable displacement pump. The actuated arm 305 may also be a lever, a direct connection, a push spring or any device or method that is able to control the movements of the actuated cam 303. The actuator arm 305 is given instructions by the actuator 307 to move the cam ring 105 a specific distance in a pivotable motion over the pivot pin 123.

The actuated cam 303 and the cam pivot 301 are formed on an inner portion of outer ring 103 and an outer portion of cam ring 105. There may also be another pin (not shown) on the actuated arm 305, which assists the actuated arm 305 in moving the cam ring 105. One side of the actuated arm 305 is connected to the actuator 307 and the other side of the actuated arm 305 extends through a portion of the outer ring 103 to the cam ring 105. Thus, the actuator 307 is linked to the cam ring 105.

As described above, when the electronic actuator 307 receives instructions from the control module, then the electronic actuator 307 through the actuated arm 305, the actuated cam 303 and the cam pivot 301 moves the cam ring 105 in a pivotable motion over the pivot pin 123. For example, responsive to the measurements received by the control module, the electronic actuator 307 may: not move the cam ring 105 over the pivot pin 123, move the cam ring 105 over the pivot pin 123 slightly to the left of the outer ring 103, or move the cam ring 105 over the pivot pin 123 all the way to the left of outer ring 103, as shown in FIG. 3. The aforementioned example does not limit the ability of the actuator 307 to move the cam ring 105 in any direction.

Figure 3B:
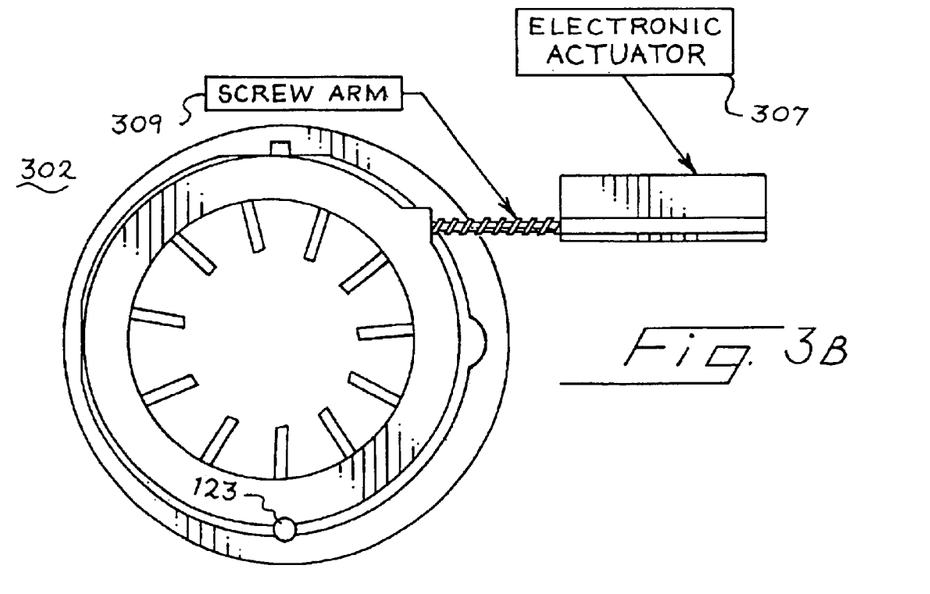
FIG. 3B depicts another view of the main part of the variable displacement pump according to the preferred embodiment of the invention.

FIG. 3B depicts another view of the main part of the variable displacement pump. A second view 302 includes the outer ring 103, the cam ring 105, the pivot pin 123, a screw arm 309 and the electronic actuator 307. The screw arm 309 is a threaded mechanical arm. The screw arm 309 is also a mechanical arm that moves the cam ring 105 in the variable displacement pump. Further, the screw arm 309 is given instructions by the actuator 307 to move the cam ring 105 a specific distance in a pivotable motion over the pivot pin 123.

The screw arm 309 has two sides, one side is connected to the electronic actuator 307 and the other extends through the outer ring 103 to the cam ring 105. As described above, when the electronic actuator 307 receives instructions from the control module, then the electronic actuator 307, through the screw arm 309, moves the cam ring 105 in a pivotable motion over the pivot pin 123. For example, responsive to the measurements received by the control module the electronic actuator 307 may: not move the cam ring 105 over the pivot pin 123, move the cam ring 105 over the pivot pin 123 slightly to the left of the outer ring 103, or move the cam ring 105 over the pivot pin all the way to the left of the outer ring 103, as shown in FIG. 3. The aforementioned example does not limit the ability of the actuator 307 to move the cam ring 105 in any direction.

Figure 4:
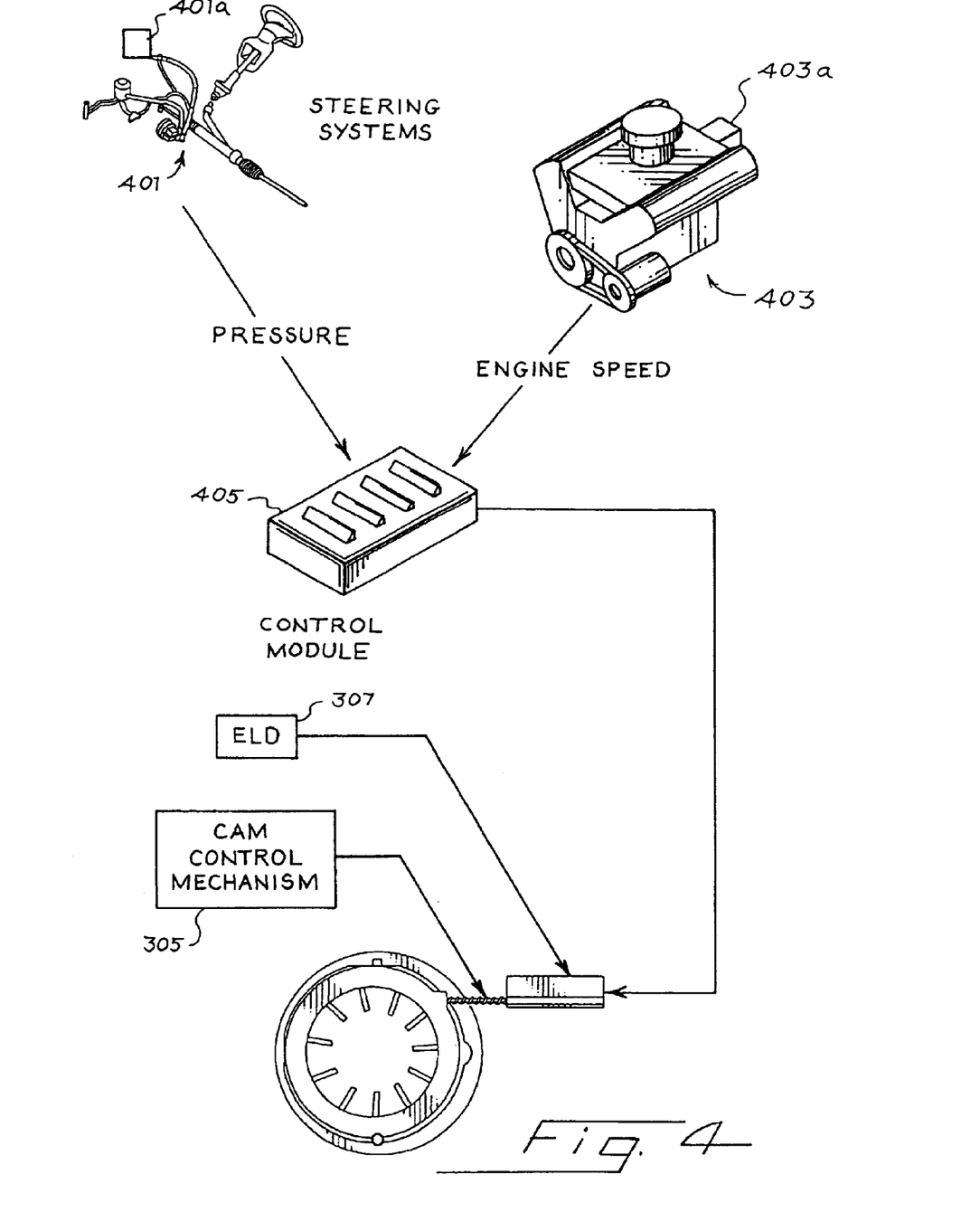
FIG. 4 depicts a representation of the main part of the variable displacement pump controlled by a power steering system and engine speed according to the preferred embodiment of the invention.

FIG. 4 depicts a representation of the main portion of the variable displacement pump that is controlled by a power steering system and engine speed. The actuator is preferably an electronic actuator. In this figure, there is a system that includes: a power steering system 401, an engine 403, a control module 405, the electronic actuator 307, the actuated arm 305, the outer ring 103, the cam ring 105 and the rotor 111. Power steering system 401 includes at least one sensor 401a that provides measurements of pressure to the control module 405. The engine 403 also includes at least one sensor 403a that provides measurements of engine speed to the control module 405.

After the control module 405 receives these measurements, the module 405 compares the measurements, by utilizing a processor, with a look-up table that includes measurements of engine speed and measurements of pressure from a power steering system of the vehicle to determine where on the look-up table the measurements from at least one sensor 403a of engine speed and measurements from at least one sensor 401a of pressure from the power steering system fall. When the control module 405 determines where on the look-up table the measurements from at least one sensor 401a of engine speed and measurements from at least one sensor 403a of pressure from the power steering system fall, the control module 405 instructs the electronic actuator 307 to move the cam ring 105 in a pivotable motion. The electronic actuator 307 utilizes the actuated arm 305 or screw arm 309 to move the cam ring 105 in a pivotable motion over the pivot pin 123.

Figure 5:
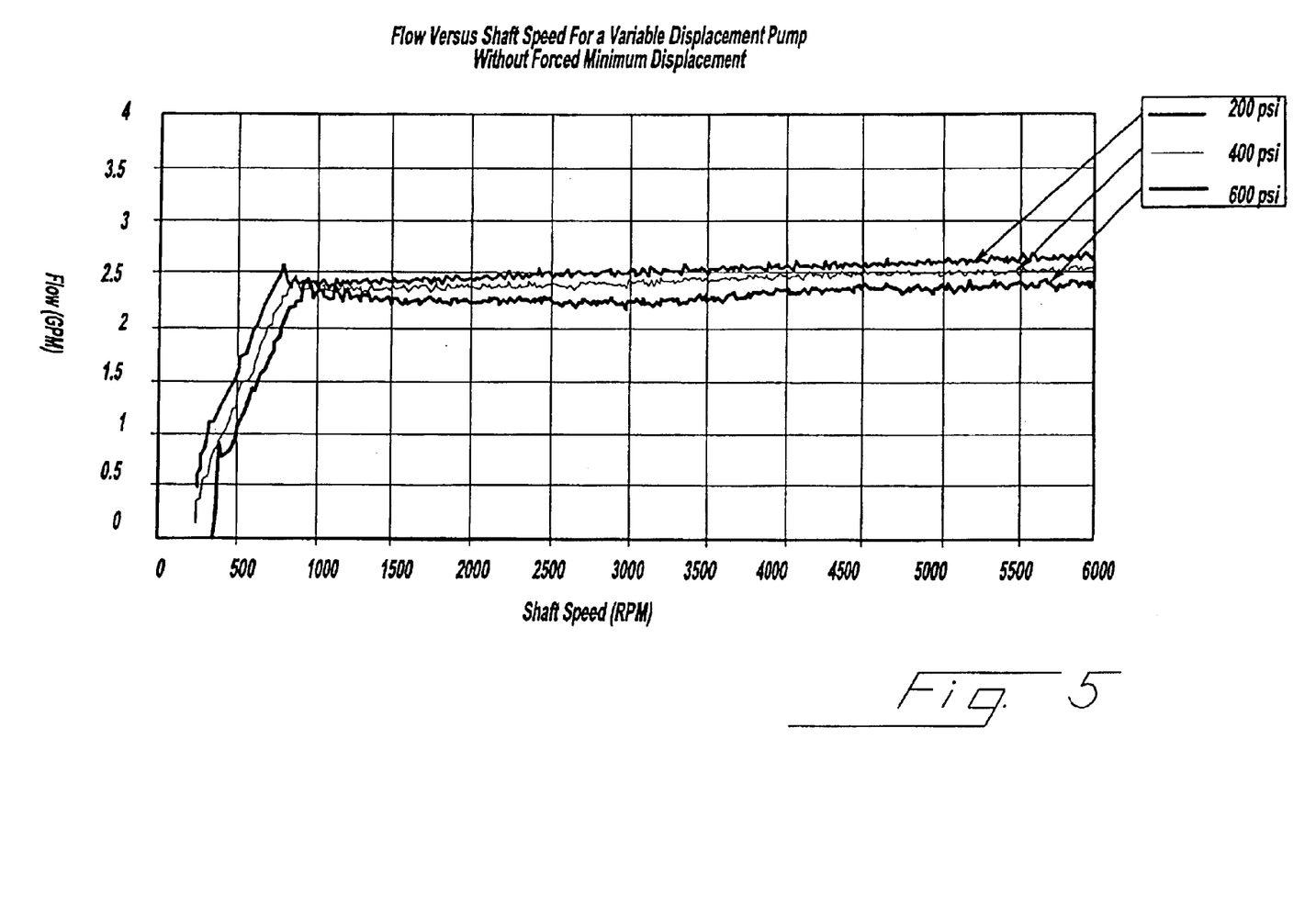
FIG. 5 is a graphical depiction of the relationship between pump flow versus shaft speed (in rpm) at various pressures without forced displacement adjustment according to the preferred embodiment of the invention.

FIG. 5 is a flow curve depicting an initial pump function of flow versus shaft speed. This flow curve shows that pump shaft speed (in rpm) is related to pump flow (in GPM) for a variable displacement pump of the preferred embodiment. Regardless of system pressure, increase of shaft speed from approximately 400 rpm to about 800 rpm led to an increase in fluid movement in the pump of from less than about 0.5 GPM to about 2.5 GPM. Further increases in shaft speed had little impact on the fluid movement, as at higher rpm, the cam ring is pivoted to a position that results in lower displacement of fluid movement in the pump. Note that a minimum flow in steering gear is required to obtain power assist. Generally, steering input changes back pressure, and causes the cam to shift for higher displacement to get higher flow.

Figure 6:
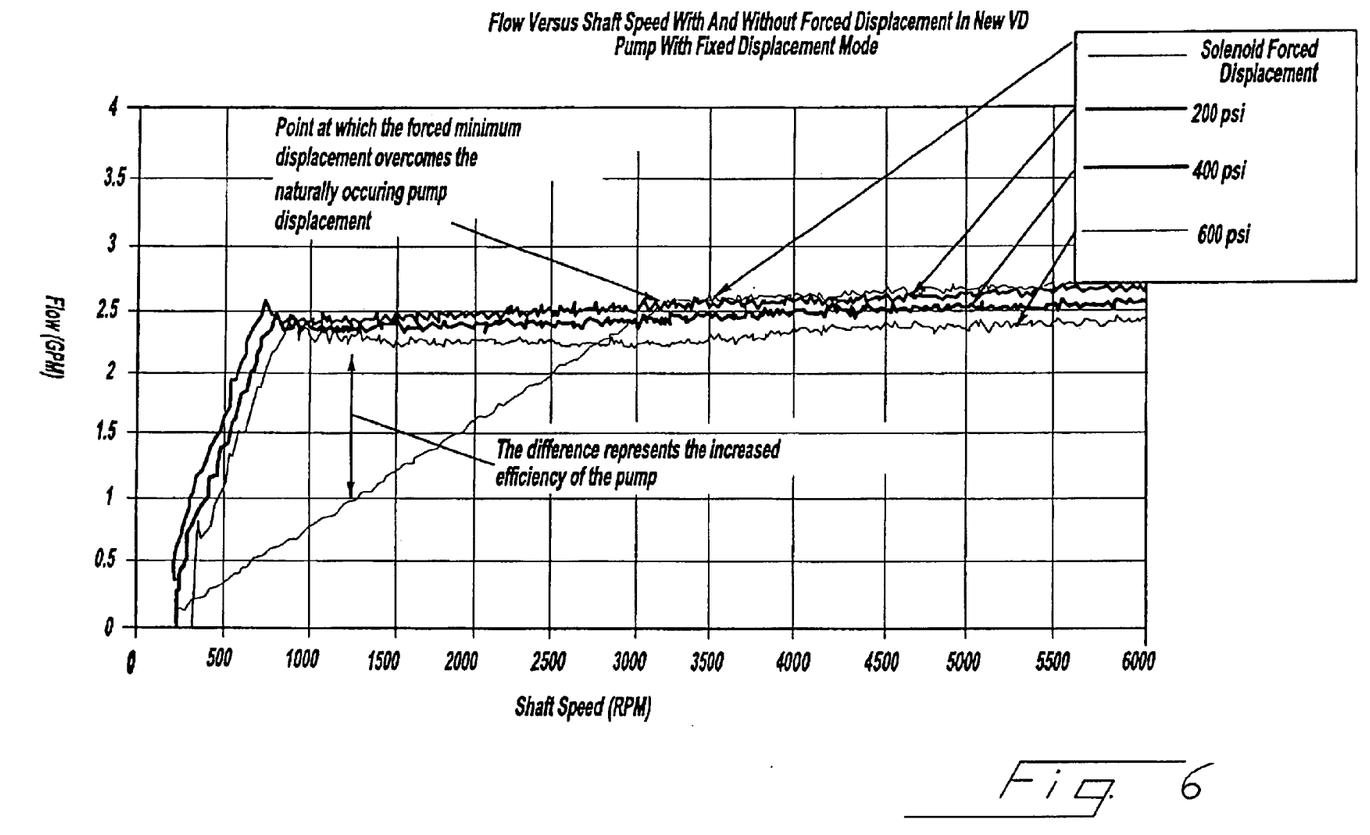
FIG. 6 is a graphical depiction of the relationship between pump flow versus shaft speed (in rpm) at varying pressures with forced displacement adjustment according to the preferred embodiment of the invention.

FIG. 6 is a flow curve depicting the utilization of an electronic leverage device and its effect on a variable displacement pump. This flow curve shows pump shaft speed is related to pump flow for a variable displacement pump constructed in accordance with the views 300 and 302 illustrated in FIG. 3. FIG. 6 demonstrates in graphical form the dramatic difference in flow at shaft speeds ranging from about 400 rpm to about 3000 rpm at three different pressures when the cam is forced to a position of minimum displacement. When the shaft speed reaches a point where the "naturally" occurring displacement equals or approximates that obtained with forced displacement of the cam by the piston, the actuator 307 can be turned off or deactivated. Naturally occurring displacement refers to the displacement that results from operation of the variable displacement pump in variable displacement mode, wherein the displacement is reduced in response to higher pump shaft speed. Above a certain pump shaft speed, the displacement of the pump will be reduced below or approximate the displacement that would be caused by activation of the actuator 307.

The actuator 307 can be deactivated at lower shaft speeds in response to steering maneuvers. The reduction in flow when the cam is forced into a minimum displacement position and when the actuator 307 of the present invention is not present or is not activated corresponds to the greatly increased efficiency of pumps and hydraulic systems constructed and utilized in accordance with the present invention.

In an embodiment of an automotive power steering system, the gear piston must always be charged. The minimum displacement required to maintain the gear piston charge is calculated as the minimum displacement to overcome the internal leakages in the pump and gear assemblies. For example, if the internal leakage in the pump and gear were 0.3 and 0.2 gallons per minute respectively, the minimum displacement would have to be 3.06 cc per rev. In other words, the cam ring cannot be forced into a position wherein the displacement of the pump is not sufficient to keep the gear piston charged.

The combined internal leakage value for a particular power steering system can be calculated, and either the actuator 307 programmed or adjusted to maintain the minimum displacement, or a mechanical stop used to maintain the minimum displacement. This would prevent the pump from producing a flow lower then the combined internal leakage and consequently would keep the gear piston charged. A factor of safety could easily be added in the actuator 307. However, the actuator 307 controlled displacement cannot be held throughout the rpm range, as at higher rpm, the actuator 307 controlled minimum displacement becomes higher than the "naturally" occurring displacement in the pump, as shown in FIG. 5. At the point where the forced displacement becomes less than the "naturally" occurring displacement, the actuator 307 would be switched off, so that the actuator controlled variable displacement pump functions like a standard variable displacement pump.

EXAMPLE 1

The improved efficiency of an actuator controlled variable displacement pump was tested using a computer simulation. The change in fuel economy for the actuator controlled variable displacement pump versus a standard variable displacement pump was evaluated. The pumps were modeled in a standard sport-utility vehicle. A vehicle stimulation program model was used that measures fuel economy for highway and city driving. The results are equivalent to the advertised sticker fuel economy placed on the vehicles before sale. Using the vehicle simulation program model, the actuator 307 pump saved an additional 0.01-mile per gallon (mpg) in a metro-highway scenario.

The improved pumps of the present invention are useful in all modes of self-propelled vehicles, such as but not limited cars, buses, and trucks, and may also be useful in other applications.

While a new actuator controlled variable displacement power steering pump has been disclosed as an example, there could be a wide range of changes made to this pump and hydraulic systems incorporating the same without departing from the present invention.

Thus it is intended that the foregoing detailed description be regarded as illustrative rather than limiting and that it be understood that it is the following claims, including all equivalents, which are intended to define the scope of the invention.

We claim:

1. A variable displacement pump comprising:
    a pump body having an outer ring defining an inner cavity, wherein the inner cavity further defines a pump suction path and a pump discharge path in fluid communication with said inner cavity;
    a cam ring pivotably supported in said inner cavity by a pivot pin formed on a portion of an inner diameter of said outer ring;
    an actuated cam formed on said cam ring;
    an actuator linked to said cam ring for moving said cam ring in a pivotable motion;
    a control module linked to said actuator;
    a fluid pressure chamber formed in the inner cavity through a seal means;
    a rotor having plurality of vanes and mounted on a rotating shaft inside said cam ring; and
    a pump chamber formed between the inner diameter of the cam ring and an outer diameter of the rotor and having a first opening in said suction path and a second opening in said discharge path.

2. The variable displacement pump of claim 1, wherein the control module is configured to receive measurements from at least one sensor linked to an engine and at least one sensor linked to a power steering system.

3. The variable displacement pump of claim 2, wherein said inner cavity is defined between an inner diameter of the outer ring and an outer diameter of the cam ring.

4. The variable displacement pump of claim 3, wherein the actuated cam is formed in between another portion of the inner diameter of the outer ring and a portion of the outer diameter of the cam ring.

5. The variable displacement pump of claim 4, wherein said actuated cam comprises a cam pivot formed thereon, said cam pivot is connected to an actuated arm of the actuator.

6. The variable displacement of claim 5, wherein the actuator is linked to the cam ring through the actuated cam, the actuated arm and the cam pivot.

7. The variable displacement pump of claim 6, wherein said actuator is an electronic actuator.

8. The variable displacement pump of claim 7, further comprising a control module to control said electronic actuator.

9. The variable displacement pump of claim 8, wherein said control module is a microprocessor.

10. The variable displacement pump of claim 9, wherein the control module receives measurements from an engine and a power steering system from a vehicle.

11. The variable displacement pump of claim 10, wherein the electronic actuator moves the cam ring responsive to measurements of an engine speed from the engine and measurements of pressure from the power steering system.

12. A variable displacement pump comprising:
    a pump body having an outer ring defining an inner cavity, wherein the inner cavity further defines a pump suction path and a pump discharge path in fluid communication with said inner cavity;
    a cam ring pivotably supported in said inner cavity by a pivot pin formed on a portion of an inner diameter of said outer ring;
    an actuator linked through a screw arm to said cam ring for moving said cam ring in a pivotable motion; and
    a control module linked to said actuator.

13. A variable displacement pump comprising:
    a pump body having an outer ring defining an inner cavity, wherein the inner cavity is defined between an inner diameter of the outer ring and an outer diameter of the cam ring, and the inner cavity defines a pump suction path and a pump discharge path in fluid communication with said inner cavity;
    a cam ring pivotably supported in said inner cavity by a pivot pin formed on a portion of an inner diameter of said outer ring;
    an actuated cam formed in between another portion of the inner diameter of the outer ring and a portion of the outer diameter of the cam ring, the actuated cam including a cam pivot;
    an actuator having an actuated arm linked to said cam ring via the cam pivot for moving said cam ring in a pivotable motion;
    a control module linked to said actuator and configured to receive measurements from at least one sensor linked to an engine and at least one sensor linked to a power steering system;
    a fluid pressure chamber formed in the inner cavity through a seal means;
    a rotor having a plurality of vanes and mounted on a rotating shaft inside said cam ring; and
    a pump chamber formed between the inner diameter of the cam ring and an outer diameter of the rotor and having a first opening in said suction path and a second opening in said discharge path.

* * * * *